United States Patent [19]

Snyder et al.

[11] Patent Number: 4,864,991
[45] Date of Patent: Sep. 12, 1989

[54] METHOD AND APPARATUS FOR CONTROLLING AIR TO GAS RATIO OF GASEOUS FUELED ENGINES

[76] Inventors: Warren E. Snyder, S. 13800 Watertown Plank Rd., Elm Grove, Wis. 53122; Robert S. Joyce, 8160 Parkwood Trail, Big Bend, Wis. 53103

[21] Appl. No.: 127,155

[22] Filed: Dec. 1, 1987

[51] Int. Cl.[4] .............................................. F02M 7/00
[52] U.S. Cl. ................................... 123/344; 123/525; 123/391
[58] Field of Search ................ 123/440, 391, 527, 344

[56] References Cited

U.S. PATENT DOCUMENTS

| | | |
|---|---|---|
| 4,102,313 | 7/1976 | Laprade et al. ................ 123/440 |
| 4,364,364 | 12/1982 | Subramaniam .................... 123/527 |
| 4,512,304 | 4/1985 | Snyder ............................... 123/344 |

Primary Examiner—E. Rollins Cross

[57] ABSTRACT

Apparatus for controlling the air to gas ratio of fuel supplied to a gas engine that includes a conduit connecting the carburetor to the intake maifold of the engine. A throttle valve is located in the conduit for varying the flow area therethrough in response to load changes on the engine and a regulator device including a controller and gas regulator for changing the air to fuel gas ratio of fuel supplied to the engine in response to the position of the throttle valve.

7 Claims, 1 Drawing Sheet

METHOD AND APPARATUS FOR CONTROLLING AIR TO GAS RATIO OF GASEOUS FUELED ENGINES

BACKGROUND OF THE INVENTION

This invention relates generally to fuel systems for gaseous fueled engines. More particularly, but not by way of limitation, this invention relates to improved apparatus and methods for controlling the air to gas ratio of fuel supplied to gaseous fueled engines.

U.S. Pat. No. 4, 512,304 issued Apr. 23, 1985 to Warren E. Snyder illustrates one method and apparatus for controlling air to gas ratios in gaseous fueled engines. That system functions satisfactorily. The system described hereinafter is an improvement to the system described in the '304 patent.

Often, gaseous fueled engines are used as an industrial engine, that is, they are applied in situations where their operating speed is constant. In such installations, it is highly desirable that the operating speed be maintained despite variations in the load that occurs thereon and despite the use of different fuels. Frequently, alternate fuels such as sewage gas and natural gas are available which have significantly different heating values.

In the usual constant speed industrial engine, the application of increased load to the engine results in a slowing of the engine, and if the load is sufficiently high, may result in stalling of the engine. When the decrease in engine speed occurs, it takes a relatively long period of time for the engine to return to its desired operating speed.

Changing to a fuel having a lower heating value may also have a significant momentary effect on the operating speed of the engine. In such instances, the operating speed of the engine will drop and again, substantial time is required for the engine to return to its operating speed.

Accordingly, an object of this invention is to provide a fuel control system for a gaseous fueled engine that can be used with fuels of different heating value and under varying loads, and yet maintain the engine speed as a result of those changes as nearly constant as possible, while at the same time maintaining the air to gas ratio of the fuel at the desired value when the engine is at operating speed and under the normal loading.

SUMMARY OF THE INVENTION

In one aspect, this invention provides improved apparatus for controlling the air to gas ratio of fuel supplied to a gas engine that includes an intake manifold and an exhaust manifold connected to the engine, a carburetor having an air inlet, and a gas regulator connected to the carburetor for controlling the pressure of fuel gas to the carburetor. The improved apparatus comprises conduit means connecting the carburetor to the intake manifold, a throttle valve located in the conduit means for varying the flow area in response to load changes on the engine, and means operably connected with the regulator for changing the volume of gas supplied to the carburetor in response to the position of the throttle valve.

In another aspect, this invention provides an improved method for controlling the air to gas ratio in fuel supplied to a gas engine that includes the intake manifold and an exhaust manifold connected to the engine, a carburetor having an air inlet and a gas regulator connected to the carburetor for controlling the pressure of gas to the carburetor. The improved method comprises sensing the position of an engine load throttle valve, generating a signal representative of such position, transmitting the signal to a controller, transmitting a signal from the controller to the regulator, and varying the regulator in response to the signal from the controller thereby varying the air to gas ratio of fuel supplied to the engine.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein.

DETAILED DESCRIPTION OF THE PREFERRED EMBODIMENT

Figure 1:
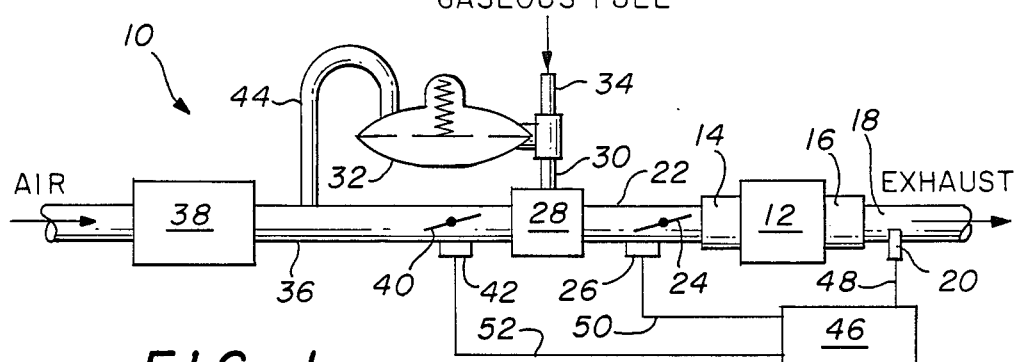
FIG. 1 is a schematic drawing illustrating air to gas ratio fuel control apparatus that is constructed in accordance with the invention.

Referring to the drawing and to FIG. 1 in particular, shown therein and generally designated by the reference character 10 is a fuel control system that is constructed in accordance with the invention. The system 10 includes an engine 12 having an inlet manifold 14 and an exhaust manifold 16. The exhaust manifold 16 is connected to an exhaust pipe 18 that includes an exhaust gas sensor 20 therein.

Connected to the inlet manifold 14 is an inlet conduit 22 that has an engine load throttle valve 24 movably positioned therein. A position sensing device 26 is located in the inlet conduit 22 adjacent to the throttle valve 24 for sensing the position of the throttle valve 24.

The conduit 22 is connected at its other end with a carburetor or mixer 28. The carburetor 28 is connected by a conduit 30 with a regulator 32 and by a conduit 34 with a source of gaseous fuel (not shown).

The air inlet conduit 36 extends from the carburetor 28 to an optional intercooler 38. Located in the air inlet conduit 36 is a valve 40 which functions as an adjustable orifice for reasons that will be explained hereinafter. The position of the valve 40 is determined by a valve actuator 42 which may be of the stepping motor type or any other suitable device for positioning the valve 40.

A balance line or conduit 44 extends from connection with the air inlet conduit 36 upstream of the valve 40 to the regulator 32. The regulator 32 is responsive to a differential in pressure thereacross to control the flow of gaseous fuel through the conduits 34 and 30 into the carburetor 28.

The exhaust gas sensor 20 is connected to a controller 46 by a conductor 48. A conductor 50 extends from the controller 46 to the sensor 26 and a conductor 52 extends from the controller 46 to the valve actuator 42. The controller 46 is designed so that the valve 40 can be repositioned in response to the exhaust gas sensor 20 and so that it can reposition the valve 40 in response to changes in position of the throttle valve 24 as sensed by the position sensor 26.

Operation of the Preferred Embodiment Air to Fuel Ratio - Normal Operation

With the engine 12 operating, the regulator 32 is admitting gaseous fuel through the conduits 34 and 30 into the carburetor 28 in accordance with the desired air fuel ratio. Inlet air flows through the air intake conduit 36, the conduit 22, and intake manifold 14 into the engine 12. Should the exhaust sensor 20 sense a change in the exhaust gas content indicating that the air fuel ratio is not as desired, a signal is transmitted through the conductor 52 to the actuator 42 to reposition the valve 40. When this occurs, a change in pressure develops across the throttle valve 40 and across the regulator 32 from the balance line 44 to the conduit 30. Depending on the change in the position of the valve 40, whether the valve is opened or closed, more or less back pressure is created in the air inlet conduit 36 which is reflected as a pressure change in the regulator 32 admitting more or less fuel gas into the carburetor 28. Accordingly, the system functions as a means for simply and efficiently maintaining the air to fuel ratio at the desired value.

Effect of Load Increase

When a load is suddenly imposed on the engine 12, the speed of the engine is reduced and a governor (not shown) causes change in the position of the engine throttle valve 24. When the load is suddenly applied, the throttle valve 24 opens. The sensor 26 senses the change in the position of the throttle valve 24 and through the controller 46 causes the actuator 42 to reposition the valve 40.

With an increase in load, the valve 40 moves to a position more fully restricting the flow through the air inlet conduit 36, causing a greater pressure differential to exist across the regulator 32. In response, the regulator 32 causes more fuel gas to be admitted into the carburetor 28 through the conduits 30 and 34. Less air is admitted through the conduit 36 into the carburetor 28 because of the greater restriction to flow caused by the valve 40 while more fuel is being admitted and thus a richer fuel mixture is provided almost instantaneously to the engine 12. The admission of the richer fuel into the engine rapidly increases the engine speed back up to the operating speed.

Laboratory tests were run on an engine operating at 1800 RPM with various loads being applied thereto. With a sudden increase in load from 0 up to 25%, the conventional fuel system allowed a 20 RPM speed drop before returning the engine to 1800 RPM while the system constructed in accordance with the preferred embodiment allowed only 10 RPM drop before returning to 1800 RPM. At a step change from 25 to 50% load, the conventional system allowed a 130 RPM drop while the system of this invention allowed a drop of 40 RPM. At a step change from 50 to 75% load, the conventional system allowed 350 RPM while the proposed system allowed a drop of 40 RPM before returning to 1800 RPM. Under a sudden increase from 75% to 100% load, the conventional system stalled while the system constructed in accordance with the preferred embodiment allowed only a 50 RPM drop before returning the engine to 1800 RPMs. Thus, it can be seen that the system constructed in accordance with the preferred embodiment was substantially quicker in returning the engine to its operating speed and in the situation where the load was increased 75-100%, prevented stalling of the engine altogether.

Effect of Heating Value Change

In the event that the engine 12 is operating on a fuel having a particular heating value, a change to a fuel having a different heating value requires a change in the air fuel ratio. Accordingly, the valve 40 can be adjusted to immediately compensate for the change in fuel and thus provide the appropriate air gas ratio. A change in exhaust gas content will be detected by the exhaust gas sensor 20. The change of the position of the valve 40 alters the air to fuel gas ratio to provide the proper fuel for operating the engine 12 at the desired speed.

From the foregoing, it can be appreciated that the fuel control system 10 provides a simple and reliable method for controlling the air to fuel gas ratio of the fuel supplied to the engine, a significant gain in the engine acceleration characteristics when increased loads are suddenly applied to the engine, and an arrangement which can easily adapt the engine to operate on fuels having different heating values.

Figure 2:
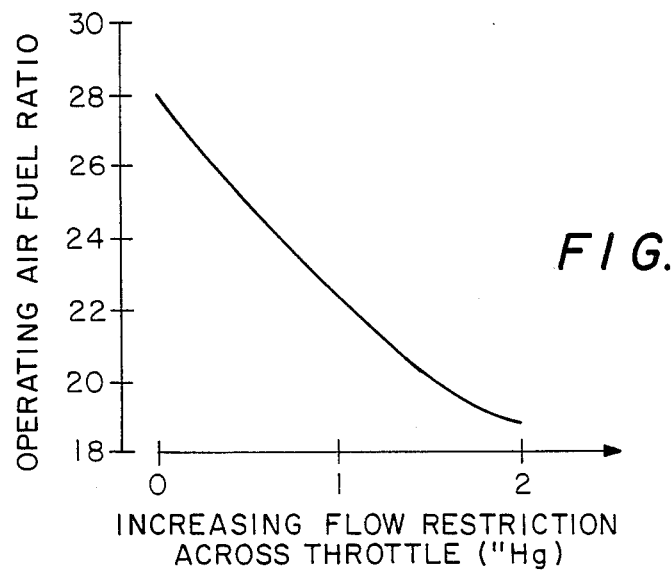
FIG. 2 is a curve illustrating the effect of varying an inlet air flow restriction that is located in fuel control apparatus that is constructed in accordance with the invention.

Each of the advantages ascribed to the invention depends upon the ability to restrict flow in the air intake conduit 36 to create a differential pressure across the regulator 32 causing more gaseous fuel to enter the carburetor 28 and thus enriching the fuel reaching the engine 12. FIG. 2 is a curve of a gaseous fueled reciprocating engine operating at constant load and speed and illustrating the effect on air-fuel ratio of changing the flow restriction.

As can be seen therein, increasing the flow restriction by 2 inches of Hg causes the air to fuel ratio to decrease from approximately 28 to about 19. It will, of course, be understood that as the air to fuel ratio decreases in value, the fuel being supplied to the engine has a substantially greater percentage of gaseous fuel and thus is much richer. The richer mixture being provided rapidly increases the speed of the engine back to the desired operating speed.

Figure 3:
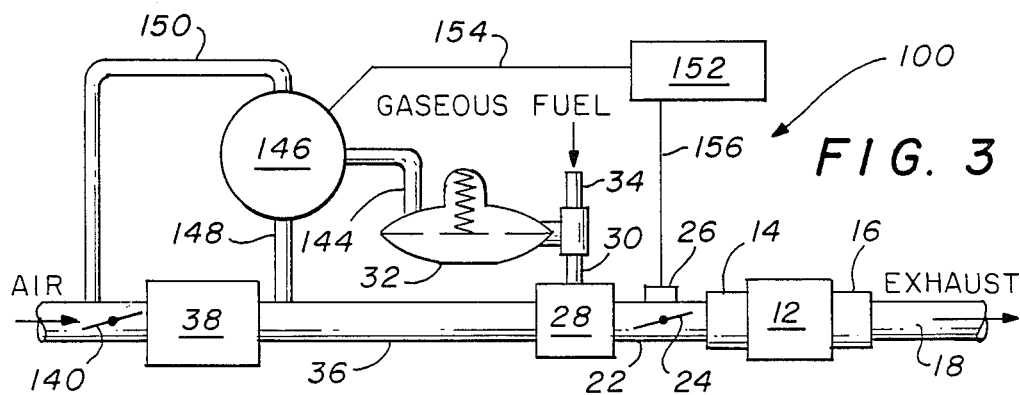
FIG. 3 is a schematic diagram illustrating another embodiment of an air to gas ratio fuel control system that is also constructed in accordance with the invention.

The Embodiemnt of FIG. 3

Referring to FIG. 3, shown therein and generally designated by the reference character 100 is another embodiment of air to fuel gas ratio control system for controlling the fuel supplied to the engine 12. The same reference characters will be used in describing the embodiment of FIG. 3 as used in describing the embodiment of FIG. 1 when the reference characters refer to identical parts.

The system 100 includes the engine 12 having the intake and exhaust manifolds 14 and 16 attached thereto. The exhaust conduit 18 is attached to the exhaust manifold 16. Connected with the intake manifold 14 is a conduit 22 that contains the engine throttle valve 24.

The conduit 22 has its opposite end attached to the carburetor 28 which is also connected with the regulator 32 by means of the conduit 30 and with a source of gaseous fuel (not shown) by the conduit 34. The air intake conduit 36 includes the optional heat exchanger 38 and extends into connection with the carburetor 28.

The regulator 32 is connected to a valve 146 by a conduit 144. The valve 146 is connected to the air intake conduit 36 downstream of the heat exchanger 38 by a conduit 148 thus forming a first balance line to the regulator 32. The valve 146 is also connected to the air intake conduit 36 upstream of the heat exchanger by a conduit 150 forming a second balance line. The valve 146 is arranged so that pressure is transmitted through the conduit 150 and the conduit 144 or through the conduit 148 and the conduit 144 to the regulator 32.

To control position of the valve 146, a controller 152 is provided which is connected by conductor 154 with the valve 146 and by a conductor 156 to the position sensing device 26. Thus, the position of the valve 146 is directly controlled by the controller 152 in response to changes in position of the valve 24.

An orifice or a throttle valve 140 is located in the air intake conduit 36 between the heat exchanger 38 and the conduit 150. The valve 140 is preferably arranged to be manually positioned. That is, the valve 140 is of any suitable type which can be adjusted to change or vary the resistance to flow through the air intake conduit 36.

In operation with the engine 12 running at normal load and speed, the controller 152 positions the valve 146 so that pressure through the conduit 150 is prohibited. When the valve 146 is in this position, the engine 12 and the system 100 are operating in a normal mode.

In the event that a load is suddenly applied to the engine 12, the throttle valve 24 changes position due to the action of a governor (not shown). The change in position of the throttle valve 24 is sensed by the position sensor 26 and the controller 152 causes the valve 146 to move to a position permitting pressure from the conduit 150 and preventing pressure through the conduit 148. Due to the location of the valve 140, a pressure differential occurs across the regulator 32 which results in a higher ratio of gaseous fuel being introduced into the carburetor 28 as compared to the amount of air flowing through the air intake conduit 36. Accordingly, the engine 12 will receive a much richer fuel mixture and its acceleration will be increased rapidly bringing the engine back to operating speed.

From the foregoing, it will be appreciated that the system described with respect to FIG. 3 does not have the versatility attributed to the system described in connection with FIG. 1. However, it will be noted that the system of FIG. 3 will also provide for the increase in acceleration of the engine to restore the engine to operating speed much more quickly than is possible with normal fuel control systems.

It will be understood that the systems described in detail herein are presented by way of example only and that many changes and modifications can be made thereto without departing from the spirit or scope of the invention.

What is claimed is:

1. Improved apparatus for controlling the air to gas ratio of fuel supplied to a gas engine that includes an intake manifold and an exhaust manifold connected to the engine, a carburetor having an air inlet, and a gas regulator connected to the carburetor for controlling the pressure of gas to the carburetor, said improved apparatus comprising:
   conduit means connecting the carburetor to the intake manifold;
   a throttle valve located in said conduit means for varying the flow area therethrough in response to load changes on said engine; and,
   means operably connected with said regulator for changing the volume of gas supplied
   to said carburetor in response to said carburetor in response to the position of said throttle valve, said means operably connected with said regulator including position sensing means for sensing the position of said throttle valve and for transmitting a signal indicative of such position to said regulator.

2. The apparatus of claim 1 and also including:
   an inlet air conduit connected to said carburetor; and,
   flow restricting means located upstream of said carburetor.

3. The apparatus of claim 2, wherein said means operably connected with said regulator includes position control means connected with said flow restricting means for varying the resistance to inlet air flow to said carburetor.

4. The apparatus of claim 2 wherein said flow restricting means is manually adjustable.

5. The apparatus of claim 3 and also including exhaust gas sensing means connected to said position control means for varying the position of said flow restricting means to change the air to gas ratio in response to changes in exhaust gas content.

6. An improved method for controlling the air to gas ratio in fuel supplied to a gas engine that includes an intake manifold and an exhaust manifold connected to the engine, a carburetor having an air inlet, and a gas regulator connected to the carburetor for controlling the pressure of gas to the carburetor, said improved method comprising the steps of:
   sensing the position of an engine load throttle valve;
   generating a signal representative of such position;
   transmitting said signal to a controller;
   transmitting a signal from said controller to said regulator; and,
   varying said regulator in response to the signal from said controller varying said air to gas ratio to said engine.

7. The method of claim 6 wherein the step of varying said regulator includes adjusting a second throttle valve located in an air inlet to said engine upstream of said carburetor.

* * * * *

UNITED STATES PATENT AND TRADEMARK OFFICE
CERTIFICATE OF CORRECTION

PATENT NO. : 4,864,991

DATED : September 12, 1989

INVENTOR(S) : Warren E. Snyder, et al.

It is certified that error appears in the above-identified patent and that said Letters Patent is hereby corrected as shown below:

Column 6, lines 12-13, delete "to said carburetor in response" (second occurrence).

Signed and Sealed this

Eighth Day of January, 1991

Attest:

HARRY F. MANBECK, JR.

*Attesting Officer*    *Commissioner of Patents and Trademarks*